United States Patent
Ness et al.

[11] 3,951,686
[45] Apr. 20, 1976

[54] ELECTRODE MASS CONTAINING NICKEL HYDROXIDE

[75] Inventors: Peter Ness; Günter Krämer, both of Kelkheim, Taunus; Elvira Tisch, Frankfurt am Main, all of Germany

[73] Assignee: Varta Batterie Aktiengesellschaft, Hannover, Germany

[22] Filed: July 25, 1974

[21] Appl. No.: 491,804

[30] Foreign Application Priority Data
Aug. 13, 1973 Germany............................ 2340869

[52] U.S. Cl................................. 136/28; 136/29
[51] Int. Cl.²........................................... H01M 4/38
[58] Field of Search .............. 136/28, 29; 106/301; 252/62.3, 472; 423/592–594, 140

[56] References Cited
UNITED STATES PATENTS

| | | | |
|---|---|---|---|
| 2,699,458 | 1/1955 | Schlecht et al. .................... | 136/28 |
| 3,057,699 | 10/1962 | Pell et al. ........................... | 136/29 X |
| 3,066,178 | 11/1962 | Winkler .............................. | 136/29 X |
| 3,076,860 | 2/1963 | Dickfeldt et al. .................. | 136/28 X |
| 3,089,913 | 5/1963 | Garten et al. ...................... | 136/28 X |
| 3,108,910 | 10/1963 | Herold ............................... | 136/29 |
| 3,174,878 | 3/1965 | Peters ................................. | 136/28 X |
| 3,535,998 | 11/1967 | Langguth et al. .................. | 136/28 X |
| 3,595,697 | 7/1971 | Dickfeldt et al. ................... | 136/28 |
| 3,615,830 | 10/1971 | Johnson ............................. | 136/28 X |
| 3,827,911 | 8/1974 | Pickett ................................ | 136/29 |

*Primary Examiner*—Howard S. Williams
*Assistant Examiner*—C. F. LeFevour
*Attorney, Agent, or Firm*—Weiser, Stapler & Spivak

[57] ABSTRACT

A positive electrode for alkaline storage batteries contains as its active mass a ternary mixture of nickel hydroxide, cadmium hydroxide, and cobalt hydroxide.

10 Claims, 2 Drawing Figures

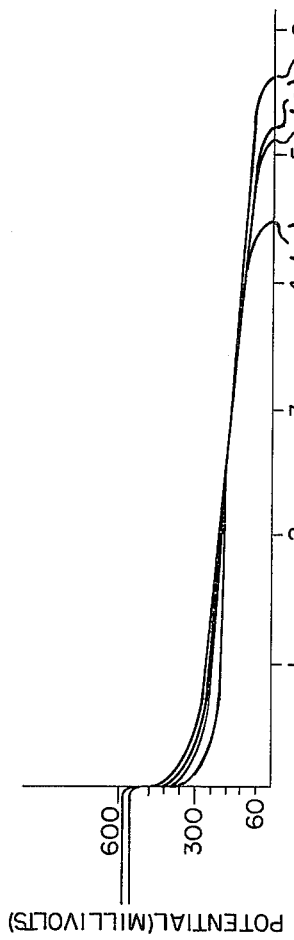
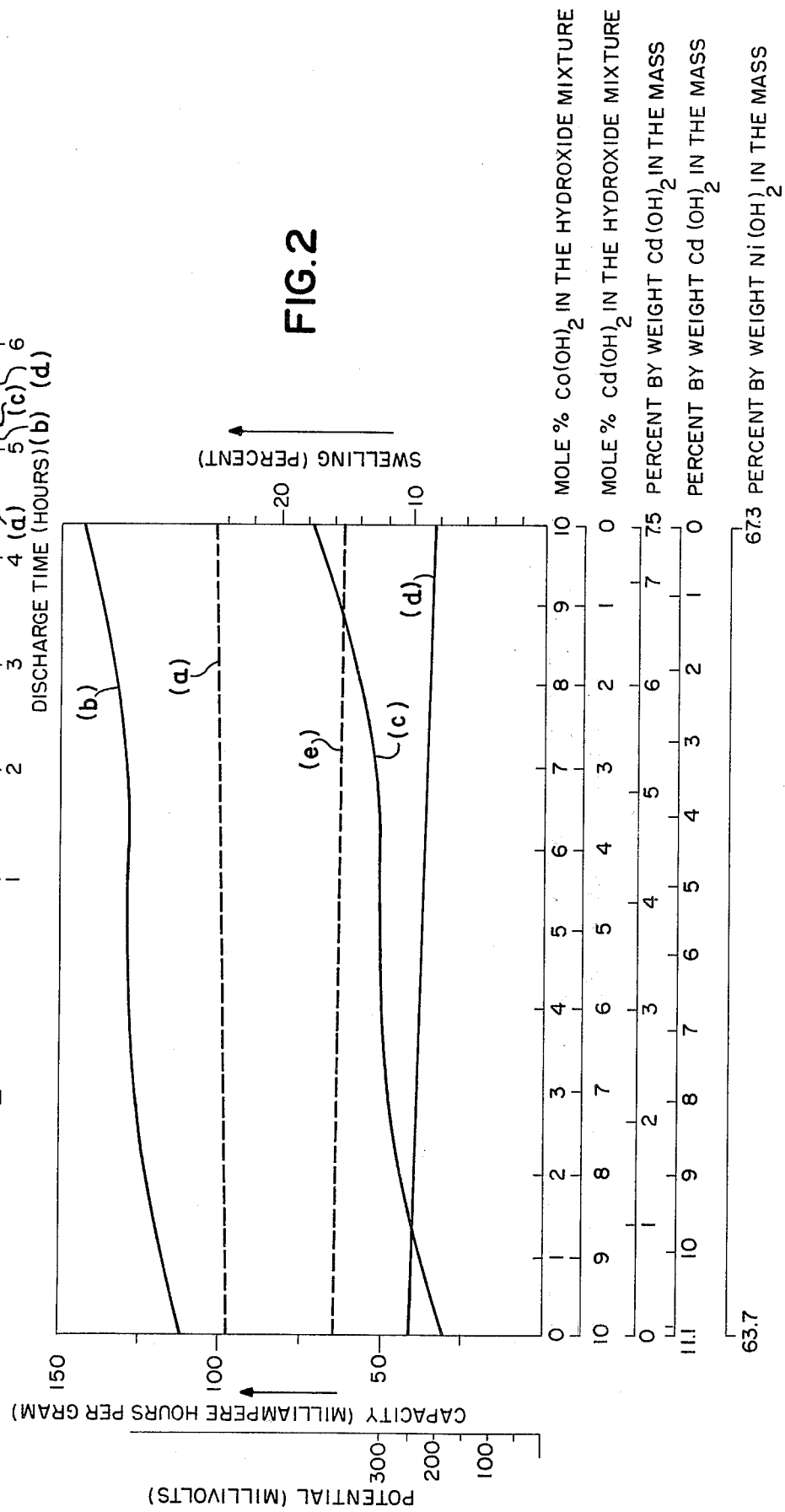
FIG.1
FIG.2

ELECTRODE MASS CONTAINING NICKEL HYDROXIDE

The invention relates to the construction of positive electrodes for alkaline storage batteries, and particularly to such electrodes whose active mass includes nickel hydroxide.

To enhance the storage capacity of positive nickel hydroxide electrodes in alkaline storage batteries, various proposals have been made for the addition for cobalt hydroxide to the active mass.

When sinter sheet electrodes are used, the cobalt hydroxide is introduced by saturating the nickel hydroxide electrode with a cobalt salt solution followed by immersion in potassium hydroxide. In so doing, there is precipitated within the pores of the sinter body cobalt hydroxide, in addition to the previously present nickel hydroxide. It is also known, in the same connection, to mix cobalt hydroxide directly into an active nickel hydroxide mass which contains the customary additives of a conductive material, such as nickel or cobalt flakes or graphite. (See German Patent Application V 55 52 IVa/21b).

Particular advantages attributed to this addition of cobalt are improved mass utilization of the nickel hydroxide electrode, activation of the active mass, and better charge uptake.

Particularly when nickel hydroxide and cobalt hydroxide are precipitated out of the solution of sulfates in potassium hydroxide a noticeable improvement of storage capacity takes place relative to an electrode mass free of additive. The improvement in mass utilization increases linearly with the cobalt hydroxide content and can approach 30% for a relationship of 90 mole % $Ni(OH)_2$ to 10 mole % $Co(OH)_2$.

This desirable effect is, however, accompanied by a considerable disadvantage, namely unusually pronounced swelling or growth of the electrode.

Accordingly, it is an object of the invention to provide an active nickel hydroxide mass for alkaline storage batteries in which the advantages of a cobalt hydroxide additive are retained, while the tendency to swelling due to this additive is considerably reduced.

This, and other objects which will appear are achieved in accordance with the invention by using as the active mass a ternary mixture of approximately 88 – 92 mole % nickel hydroxide, approximately 4 – 8 mole % cadmium hydroxide, and approximately 8 – 4 mole % cobalt hydroxide.

Particularly desirable are active masses composed of approximately 90 mole % nickel hydroxide, 3 – 7 mole % cadmium hydroxide, and 7 – 3 mole % cobalt hydroxide.

Such a mass can, for example, be used as electrode with the customary admixture of conductive material, such as conductive graphite in the form of a pressed body with a nickel mesh envelope.

Due to the further addition in accordance with the invention of cadmium hydroxide to the active mass consisting of nickel hydroxide and cobalt hydroxide it becomes possible to retain to a considerable degree the capacity enhancing effect of cobalt, but without suffering from the pronounced swelling of a mass which is doped with cobalt alone. However, it is a prerequisite of this effect that the cadmium hydroxide is present alongside the cobalt hydroxide homogeneously in the nickel hydroxide lattice. This can be achieved for example, by simultaneous precipitation of all three ions from a common solution of their sulfates in a ternary hydroxide mixture. In lieu of precipitation from sulfate solutions, it will be understood that other salt solutions, such as nitrate solutions, may be used.

Electro-chemical analysis of hydroxide mixtures, according to the invention, consisting of 90 mole % $Ni(OH)_2$ and 10 mole % $Co(OH)_2$ and $Cd(OH)_2$ in varying proportions, shows that, within predetermined concentration relationships of the two additives, the mass utilization is greatly increased relative to an additivefree nickel hydroxide electrode while, at the same time, the undesired swelling is considerably diminished.

Especially desirable results are achieved when the additive concentrations are in the range from 3 mole % $CO(OH)_2$ and 7 mole % $Cd(OH)_2$, to 6 mole % $Co(OH)_2$ and 4 mole % $Cd(OH)_2$. The capacity of such an electrode exceeds by 24% that of a nickel hydroxide electrode having the same weight but free of additive, while the swelling relative to the latter is reduced by about 4%. The swelling in an electrode composed only of nickel hydroxide is primarily the result of the volumetric differences between the different hydroxide phases which are produced during charging and discharging.

For further details, reference is made to the description which follows, in the light of the accompanying drawings wherein FIG. 1 illistrates the variation of potential as a function of time, for electrodes embodying the invention and also for electrodes utilizing only a single additive; and FIG. 2 illustrates the variations in capacity and swelling as a function of the content of various ingredients.

Referring to FIG. 1, this shows four separate curves (a) thru (d), respectively representing the variation as a function of time of the potential during discharge for the following compositions.

Curve (a) — 10 mole % $Cd(OH)_2$ additive.
Curve (b) — 3 mole % $Co(OH)_2$ and 7 mole % $Cd(OH)_2$ in hydroxide mixture.
Curve (c) — 7 mole % $Co(OH)_2$ and 3 mole % $Cd(OH)_2$ in hydroxide mixture.
Curve (d) — 10 mole % $Co(OH)_2$ in hydroxide mixture.

It will be noted that the potential exhibits only slight dependence upon concentration. This is true in the entire mixture range from 3 – 7 mole %, respectively, of the two additive components. In extreme mixture relationships, the absence of one, corresponding to excess of the other component becomes manifest through their specific effects.

FIG. 2, to which reference may now be had, shows capacity plotted along the left-hand ordinate, and swelling along the right-hand ordinate, and potential along a third ordinate, all as functions of the additives to the hydroxide mixture (expressed in mole % and in % by weight). There are five separate curves (a) through (e) and these respectively represent the following:

Curve (a) — the theoretical capacity of the $Ni(OH)_2$ component expressed in milliampere hours per gram (mah/g) under the experimental conditions.

Curve (b) — the experimentally determined capacity also expressed in mah/g, the value given being the average after six cycles.

Curve (c) — the overall swelling in percent, relative to the initial thickness of the electrodes after six cycles.

Curve (d) — the electrode potential relative to Hg/HgO under a load of C/5, one hour after start of discharge, C being the nominal rate of discharge current of a cell for one hour to a selected voltage, i.e. the so-called nominal one-hour rate.

Curve (e) — the swelling with 74.8% pure $Ni(OH)_2$ in the mass.

Down to 3 mole % $Cd(OH)_2$, the presence of the cadmium reduces the swelling to about 80% of its value for a pure nickel hydroxide electrode. However, for further reductions in cadmium content, this improvement atrophies more rapidly than the capacity increases. Up to that point, however, the swelling is reduced by 20% relative to an additive-free mass. Therefore a preferred composition includes 90 mole % nickel hydroxide, 7 mole % cobalt hydroxide, and 3 mole % cadmium hydroxide.

If a positive mass mixture according to the invention is produced through simple mechanical mixing of the three hydroxide components, then there is also some increase in capacity relative to a pure nickel hydroxide mass, attributable to the cobalt additive. However, the unfavorable swelling characteristics of the mass then remain undiminished. The activating effect of the cobalt upon the capacity of the nickel hydroxide electrode can therefore be used to the full, in accordance with the invention, only in combination with simultaneously precipitated cadmium hydroxide, which forms a ternary crystalline mixture with the other hydroxides and thereby inhibits the swelling.

We claim:

1. A positive electrode for alkaline storage batteries containing nickel hydroxide as active mass and characterized in that the active mass is a ternary crystalline mixture of nickel hydroxide, cadmium hydroxide, and cobalt hydroxide formed by simultaneous precipitation of all three metal ions from a common solution.

2. The electrode of claim 1, wherein said hydroxides are present in said mixture in the proportions of about 88 – 92 mole % nickel hydroxide, about 4 – 8 mole % cadmium hydroxide, and about 8 – 4 mole % cobalt hydroxide.

3. The electrode of claim 1 characterized in that said mass is a ternary mixture of about 90 mole % nickel hydroxide, about 3 – 7 mole % cadmium hydroxide, and about 7 – 3 mole % cobalt hydroxide.

4. The electrode of claim 2, wherein said cadmium hydroxide is present homogeneously within the nickel hydroxide lattice.

5. The electrode of claim 3 characterized in that said ternary mixture has about 90 mole % nickel hydroxide, about 7 mole % cobalt hydroxide, and about 3 mole % cadmium hydroxide.

6. The electrode of claim 3 wherein said ternary mixture has about 90 mole % nickel hydroxide and cobalt and cadmium hydroxides in the proportions ranging from about 3 mole % cobalt hydroxide and 7 mole % cadmium hydroxide to about 6 mole % cobalt hydroxide and 4 mole % cadmium hydroxide.

7. The electrode of claim 6, wherein the capacity exceeds that of an additive-free electrode of the same weight by about 24%, while its swelling is reduced relative to said additivefree electrode by about 4%.

8. The method of producing a positive electrode containing nickel hydroxide as active mass, characterized in that nickel hydroxide, cobalt hydroxide, and cadmium hydroxide are simultaneously precipitated in the electrode body from salt solutions of nickel, cobalt and cadmium.

9. The method of claim 8, wherein said solutions are sulfate or nitrate solutions.

10. The method of claim 9, wherein said solutions are sulfate solutions.

* * * * *